April 27, 1926.
E. RYDER
1,582,085
LIQUID LEVEL INDICATOR
Filed Jan. 24, 1924
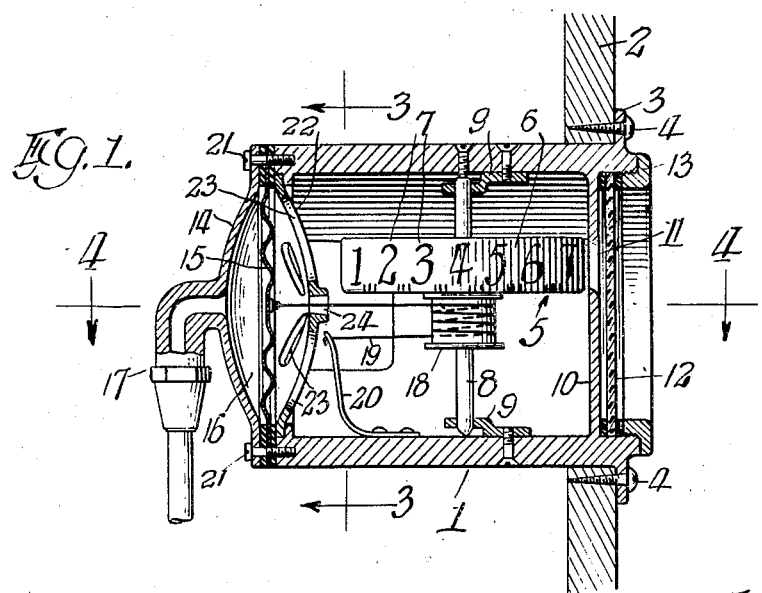
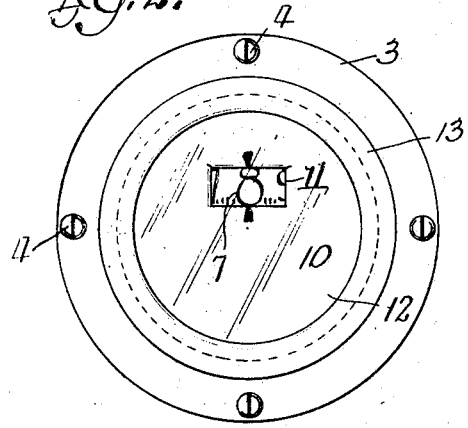
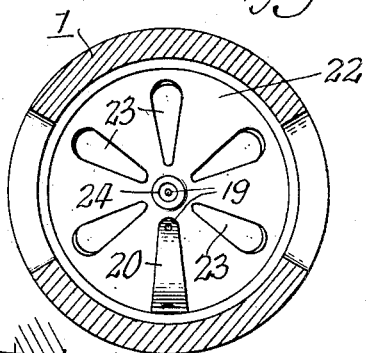
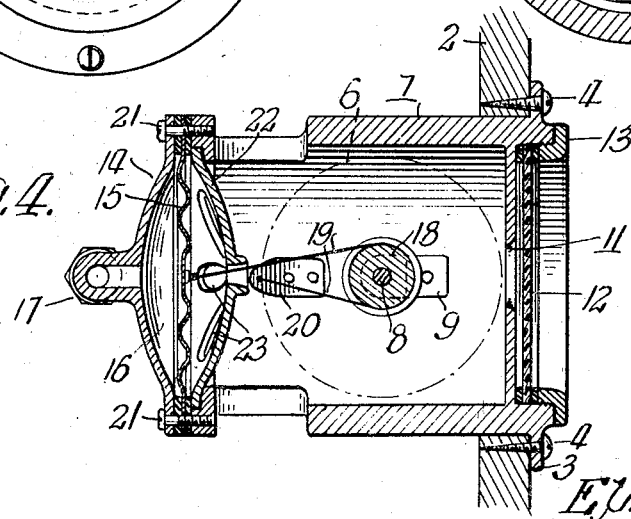
Inventor
Elmer Ryder Patented Apr. 27, 1926.

1,582,085

UNITED STATES PATENT OFFICE.

ELMER RYDER, OF BERWYN, ILLINOIS.

LIQUID-LEVEL INDICATOR.

Application filed January 24, 1924. Serial No. 688,255.

*To all whom it may concern:*

Be it known that I, ELMER RYDER, a citizen of the United States, residing at Berwyn, in the county of Cook and State of Illinois, have invented new and useful Improvements in Liquid-Level Indicators, of which the following is a specification.

This invention relates to vacuum or pressure gages particularly adapted for use on automobiles and other motor vehicles for indicating at all times on the instrument board or other place in view of the driver the amount of gasolene or other fuel in the supply tank on the vehicle.

In my copending applications, Serial Nos. 578,311 and 688,256, filed July 29, 1922, and Jan. 24, 1924, respectively, I show vacuum gages of the U-tube type containing mercury columns for indicating the amount of gasolene in these tanks.

One object of my present invention is to provide a gage device wherein a rotary disc, drum or similar indicator may be employed and thus be more easily readable than a U-tube gage, and moreover be in keeping with the speedometer and other indicating instruments usually found on the instrument board of an automobile.

The invention consists further in the matters hereinafter described and more fully set forth in the appended claims.

In the accompanying drawings—

Fig. 1 is a view of my gage device in vertical section.

Fig. 2 is a front view of the same; and

Figs. 3 and 4 are vertical and horizontal sectional views, respectively, taken on lines 3—3 and 4—4 of Fig. 1.

My improved gage device comprises a case 1 preferably cylindrical or tubular in shape and housing the operative parts of the structure. When installed on an instrument board 2 of an automobile or other motor vehicle, the case extends to the rear of said board with its forward end extending through the board, as shown in Fig. 1, and there provided with a flange 3 for screws 4 to fasten the case to the board.

Located in the case 1 is an indicator in the form of an annular member 5 in the shape of a wheel, drum or relatively thick disc, solid or hollow as may be required. The member 5 has a relatively wide, flat peripheral surface 6, on which appear characters or numerals 7 indicating units of measure, as gallons. Between the numerals, the surface 6 has graduations indicating fractions of gallons, or such other unit of measure as may be employed on the member 5. Said member 5 is mounted on a shaft 8 journaled at its ends in brackets 9, 9 fixed in the case 1. The shaft 8 extends across the case 1 so that the peripheral surface 6 of the member 5 may face the outer end of said case. There the case is closed by a partition wall 10 in which is a sight opening 11 through which the numerals 7 and graduations associated therewith may be visible. Over the partition wall 10 is a glass or like closure 12 held in place by a threaded ring 13 or other suitable means.

The rear end of the case 1 is closed by a concave wall 14, over which extends a flexible diaphragm 15, preferably of thin sheet metal, corrugated in concentric circles for stiffening purposes. The wall 14 and diaphragm 15 form between them a chamber 16, into which opens a passage in a pipe fitting 17 provided on the wall 14 on the outside thereof, as shown in Fig. 1.

Fitted to the shaft 8 on one side of the member 5 is a drum 18 about which is wrapped a cable or other flexible element 19. One end of said cable 19 is secured to the diaphragm 15, at its center, and the other end of the cable is fixed to the free end of a spring arm 20 secured in the case, as shown in Fig. 1. The diaphragm 15 is clamped between the edges of the case 1 and wall 14 by screws 21 with suitable gaskets interposed to prevent leakage into or out of the chamber 16.

When the gage device is used as a vacuum gage, suction or partial vacuum in the chamber 16 draws the diaphragm 15 inward toward the wall 14, thus drawing on the cable 19 to turn the member 5 through the drum 18. The spring 20 takes up slack in the cable 19 and maintains the same taut so that variations of vacuum in the chamber 16 may be transmitted to the member 5 and the latter indicate the same.

As a pressure indicator, fluid under pressure is admitted to the chamber 16 and variations in pressure therein transferred by the diaphragm to the member 5, as is apparent.

The wall 14 is arranged and shaped so that the diaphragm under an abnormal suction would contact with said wall through practically all portions of its area, and thus prevent breaking or cracking of the wall at such time. For pressure gage purposes, the device has a guard 22 on the side of the diaphragm toward the member 5. This guard 22 has vent holes or slots 23 to avoid building up any air between the guard and the diaphragm to insure free action of the latter under outward flexure. Moreover, the guard is so shaped that the diaphragm under any abnormal pressure will contact therewith and be prevented from breaking or cracking. When a guard 22 is used, it has a center hole 24 for the cable 19 to pass through to reach the diaphragm.

The gage device of my invention is compact, thus well adapting it to automobile uses where available space is limited. It is minimized as to parts, thus making it simple in construction and operation, with the result that its production and repair costs are low. The device being operated by cable and drum, avoids the use of complicated gear trains, sprocket and other wheels, as well as shafts and bearings for such parts. This is a factor making the device fit well with the indicator devices of my copending applications as less wear and ease of operation is gained.

The structure shown and described herein may be variously changed and modified without departing from the spirit and scope of my invention.

I claim as my invention:

1. In a gage device of the character described, the combination of oppositely arranged concave guard and wall members, a diaphragm therebetween and forming with the wall member a vacuum or pressure chamber having a pipe fitting, said guard and wall members limiting the flexing of the diaphragm in either direction and having their contact areas substantially equal to that of the diaphragm to fully support the same when in contact therewith, a movable indicator, and means for operating the indicator by the diaphragm through the guard member.

2. A gage device of the character described, comprising a tubular case, an annular indicator in said case and arranged for its peripheral surface to be viewed through the outer end of the case, a cover for such end of the case and provided with a sight opening for said indicator, a wall closing the inner end of the case, a diaphragm secured to the inner end of the case over said wall to provide therewith a vacuum or pressure chamber, a shaft extending across said case and supported thereby, with said indicator mounted thereon, a drum fitted to said shaft on one side of said indicator for turning the same, spring means in the case between said diaphragm and shaft, and a flexible element connected at one end to said diaphragm and at its other end to said spring means, said element being engaged with said drum for turning the same.

In testimony that I claim the foregoing as my invention, I affix my signature, this 21st day of January, 1924.

ELMER RYDER.